United States Patent [19]

Olliffe

[11] 3,982,162

[45] Sept. 21, 1976

[54] CENTRIFUGES

[76] Inventor: David William Olliffe, 86 Forester Road, Southgate, Crawley, Sussex, England

[22] Filed: Apr. 19, 1974

[21] Appl. No.: 462,540

Related U.S. Application Data

[62] Division of Ser. No. 61,602, Aug. 6, 1970, Pat. No. 3,832,614.

[30] Foreign Application Priority Data

Aug. 13, 1969 United Kingdom.............. 40446/69

[52] U.S. Cl.................................. 318/313; 233/24; 233/26; 318/327
[51] Int. Cl.²........................................... H02P 5/16
[58] Field of Search ............... 233/24, 26; 318/313, 318/326, 327, 346, 369, 314

[56] References Cited
UNITED STATES PATENTS

| | | | |
|---|---|---|---|
| 3,292,068 | 12/1966 | Holden | 318/327 |
| 3,462,670 | 8/1969 | Waye | 318/327 |
| 3,582,699 | 6/1971 | Badessa | 318/327 |

*Primary Examiner*—B. Dobeck
*Attorney, Agent, or Firm*—Haseltine, Lake & Waters

[57] ABSTRACT

An analytical centrifuge to receive a plurality of different rotors each carrying a track with a segment having a light reflective property distinct from adjacent regions of the track and having a length along the track which is related to the maximum desired speed of the rotor, the centrifuge having optical sensing means for sensing said segment and a time comparator for comparing the duration of the signal obtained by the sensing means in each rotor revolution with a fixed time to sense when the maximum desired speed is reached. Analytical rotors also carry a further track having distinct segments corresponding to respective compartments of the rotor and which are optically sensed to provide in conjunction with the signal obtained from the first-mentioned segment gating signals for examining selectable compartments of the rotor one-by-one.

13 Claims, 9 Drawing Figures

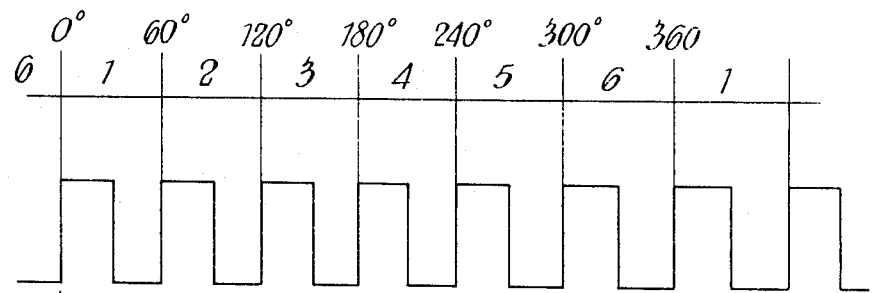
FIG.3a.
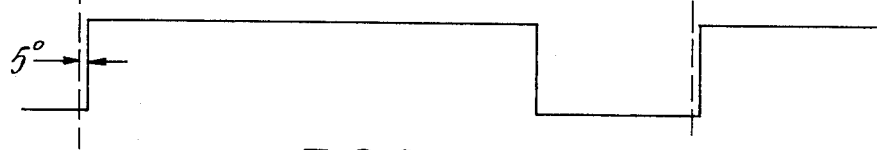
FIG.3b
FIG.4.
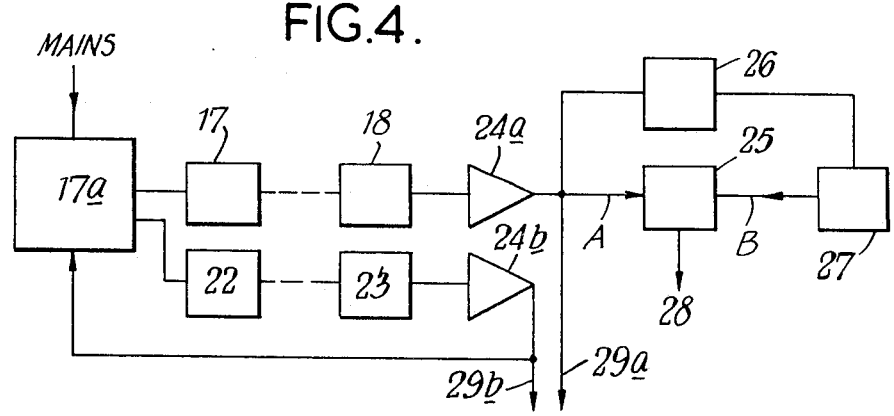

CENTRIFUGES

This is a division of application Ser. No. 61,602, filed Aug. 6, 1970, now U.S. Pat. No. 3,832,614.

BACKGROUND OF THE INVENTION

This invention relates to centrifuges, and is particularly applicable to analytical centrifuges, i.e. centrifuges having an optical or other radiation system for sensing the radiation absorption properties of material whilst it is being centrifuged.

Modern centrifuges have the requirement that they should be operable with a variety of rotors of different types and ratings. Each rotor has its own maximum permissible speed rating to avoid overspeed and damage to the rotor. In the past, mechanical systems have been employed to sense the speed rating and effect some corresponding limitation upon a motor speed control circuit whereby an operator will be overriden should he select too high a speed. In more modern systems a more direct method is employed wherein maximum permissible speed of the rotor is directly sensed, when it occurs. In practice, each rotor is provided with a plurality of distinct portions directly related in number with the maximum permissible speed. These portions are sensed optically or magnetically to create an electrical signal with a frequency proportional to actual rotor speed and to the speed rating. This signal is compared with a fixed frequency, and when equality is sensed, it is known that the rotor has reached its speed rating. However, this system operates in steps, i.e., with a given fixed frequency, there are only certain speed ratings which can be sensed. The sizes of these steps are significant in modern high speed centrifuges, where each rotor can accommodate only a limited number of portions, e.g. 5 to 15.

It is an object of the present invention to provide the possibility of a continuous range of speed ratings.

SUMMARY OF INVENTION

This object is achieved according to one aspect of the invention in that each rotor has a predetermined maximum speed of rotation defined by the length along an arcuate path around the rotor axis of a surface portion carried by the rotor, the centrifuge having sensing means for sensing said surface portion without contact therewith so as to produce a signal with a time duration which is a function of said length, and means responsive to the time duration of said signal to prevent increase in the speed of operation of the centrifuge when the time duration of said signal falls to a predetermined value.

It will be seen that said predetermined value may be preset so that it is equal to the duration of said signal when the rotor has reached a permissible maximum speed of rotation. In that case the length of said section, i.e. the angle it subtends at the axis, will be directly proportional to the desired maximum speed of the rotor.

Preferably the surface portion has a radiation affecting property different from that of adjacent surface portions of said arcuate path and the centrifuge has radiation directing or generating means for directing radiation at the path, the sensing means being radiation sensitive means for receiving radiation from the path and originating from the directing means. Thus, optical radiation may be employed.

The above aspect of the invention is applicable generally to all types of centrifuge rotors, including analytical rotors having at least two, and preferably more than two, radiation transmissive compartments to receive samples. With such rotors, in each revolution a signal is obtained for each compartment and the problem is to separate out, and record if desired, the signal corresponding to just one compartment. In a preferred embodiment, gating signals to select one of the compartments are obtained by sensing without contact with the rotor distinct portions carried by the rotor and corresponding to respective compartments, whilst the compartment selected is defined or identified by sensing a predetermined angular position of the rotor by means of said surface portion of the first aspect of the invention.

More generally, according to a second aspect of the invention, there is provided an analytical centrifuge for operation with analytical rotors with at least two compartments to receive samples, the centrifuge comprising a compartment examining system by which radiation can be passed through said compartments and the radiation transmitted through the compartments sensed and corresponding signals fed to a signal path, and sensing means for sensing without contact with the rotor distinct portions carried by the rotor and corresponding to respective rotor compartments, these means being connected to supply signals to control means of the examining system so that said signal path will carry a signal corresponding to the radiation passed through just one of the compartments, the sensing means also being effective to sense a predetermined angular position of the rotor to define the compartment corresponding to said signal on the signal path.

Thus, one can obtain from said signal path data relating to the radiation passed through one particular compartment regardless of the radiation passed through the other compartment or compartments.

The arrangement could be such that a signal will be produced in each revolution on each of two signal paths corresponding to respective ones of two compartments, the two signals being combined to produce a third signal defining the difference between the radiation absorption properties of material in said two compartments. One of these two compartments may therefore contain a reference medium.

As the sensing means is also operable to sense a predetermined angular position of the rotor to define to which distinct portion, and therefore to which compartment, the signal corresponds, the distinct portions can provide substantially identical responses at the sensing means yet a distinction can still be made between the compartments. For example, with sensing means operating optically, the portions may all have substantially the same light-affecting property, which is different from the light-affecting property of adjacent portions carried by the rotor in order to obtain distinct, but similar, signals in respect of each compartment. However, the light-affecting properties could alternatively alternate from one distinct portion to the next.

The track mentioned above in respect of the first aspect of the invention can thus be utilised to sense a predetermined angular position of the rotor, for example by sensing the leading or trailing edge of the signal produced in accordance with the first aspect of the invention.

Thus, according to another aspect of the invention, the rotor carries two arcuate tracks one having a plurality of distinct portions corresponding to respective compartments of the rotor and the other having a portion of a length along a circular path centred on the rotor axis which defines the maximum desired speed of rotation of the rotor. The latter track may then be used not only for overspeed protection but also for the synchronisation of the multicompartment scanning in accordance with the second aspect of the invention.

DESCRIPTION OF DRAWINGS

For a better understanding of the invention and to show how the same may be carried into effect, reference will now be made, by way of example, to the accompanying drawings in which:

FIGS. 3a and 3b show wave forms of signals generated by the tracks shown in FIG. 2;

FIG. 4 is a block diagram of the overspeed control circuit for the centrifuge of FIG. 1;

FIG. 1 illustrates diagrammatically an analytical centrifuge comprising a centrifuge motor 1 supplied via a variable frequency 3-phase sinusoidal inverter 2 for speed control of the motor. The motor shaft 3 is releasably coupled to a rotor 4 mounted within a vacuum tight enclosure 5 coupled to a vacuum pump or pumps 6. The rotor 5 has a plurality, for example six, of compartments two of which are indicated at 7. These compartments are closed top and bottom by light transmissive closures and are adapted to hold light transmissive cells containing material to be analysed. This material will normally be in the form of a sample suspended in a carrier liquid and this carrier liquid will be contained by itself in one cell, which will act as a reference cell.

Figure 1:
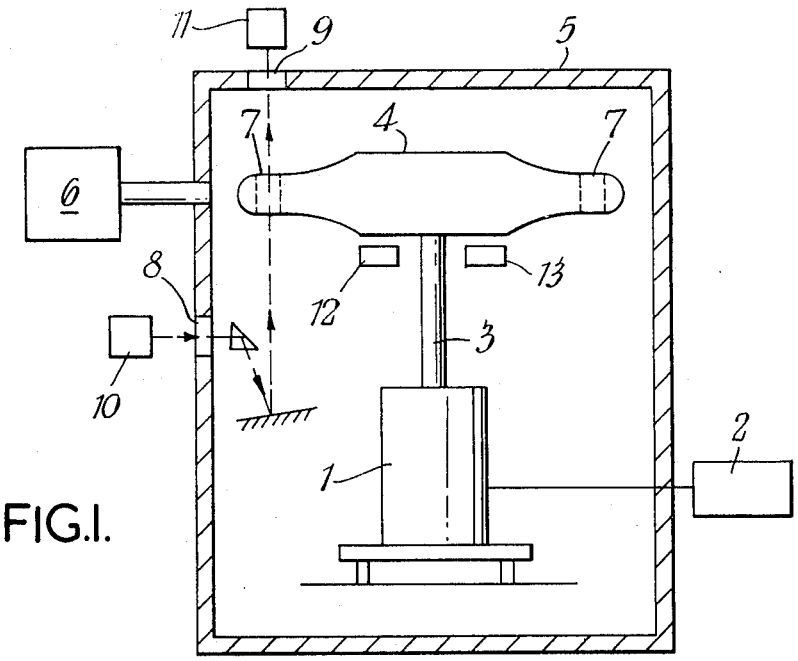
FIG. 1 is a diagrammatic representation of an analytical centrifuge.

The enclosure 5 has light transmissive windows 8 and 9 through which the cells may be viewed successively during rotation of the rotor 4. A light generating system 10 is arranged to direct light upwardly into the enclosure 5 and through successive cells, and a photo-detector 11 is positioned to receive that portion of the light which has passed through the cells. The centrifuge is also equipped with two arrangements 12 and 13 each containing a light source and a light sensor.

The light sources are arranged to direct light onto the lower surface of the rotor 4 and the light sensors are arranged to receive that light having been reflected from the rotor 4.

Figure 2:
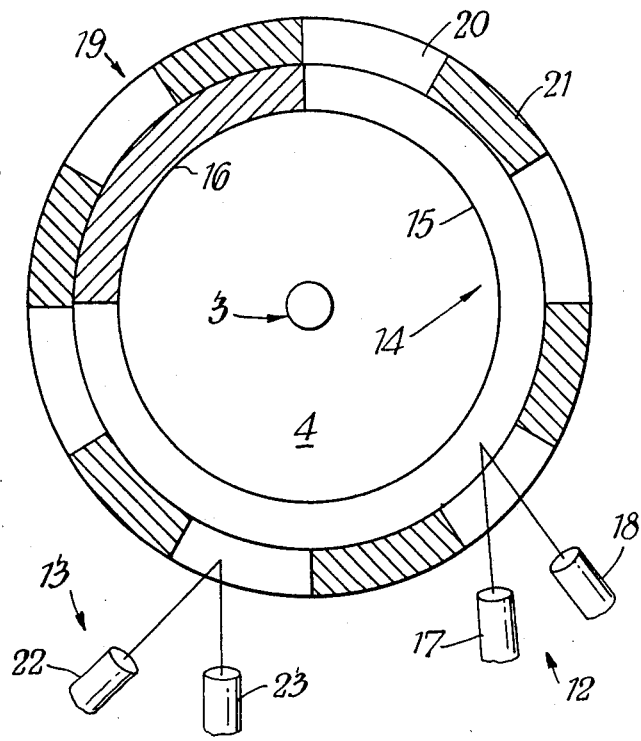
FIG. 2 is a diagram representing reflective tracks carried on the underside of the rotor of the centrifuge of FIG. 1.

FIG. 2 is a diagram showing the pattern of reflecting and substantially non-reflecting surface portions which are provided on the lower surface of the rotor 4. This pattern consists of two circular tracks concentric with the axis of rotation of the rotor, the inner track 14 consisting of a reflecting section 15 and a substantially non-reflecting section 16. The length of the section 15 is directly proportional to the desired maximum speed of rotation of the particular rotor. The arrangement 12 comprises a light source 17 directing its light onto the track 14 and a photo-detector 18 positioned to receive light reflected from this track. Accordingly, the photo-detector 18 will produce a signal in each revolution of the rotor which has a time duration which is proportional to the length of the section 15, and inversely proportional to the actual speed of rotation of the rotor. This signal is illustrated diagrammatically in FIG. 3b for a section 15 which extends for 270° about the axis of rotation of the rotor 4.

The second track 19 comprises six equal-length reflecting sections 20 spaced apart by six equal-length substantially non-reflecting sections 21. The sections 20 have their centres on substantially the same radii as the centre lines of six respective compartments in the rotor. The arrangement 13 comprises a light source 22 directing light onto the track 19 and a photo-detector 23 arranged to receive reflected light from this track. The signal produced by the photo-detector 23 is indicated in FIG. 3a.

Figure 5A:
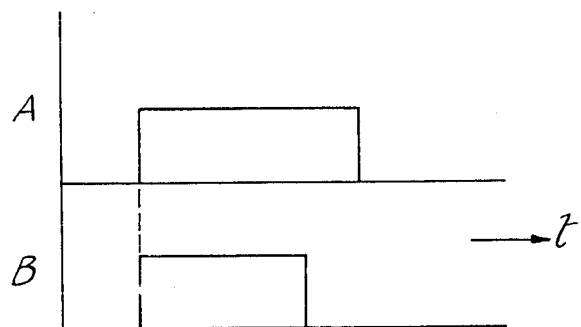
FIGS. 5a and 5b are wave forms indicating the manner of operation of the circuit of FIG. 4.
Figure 5B:
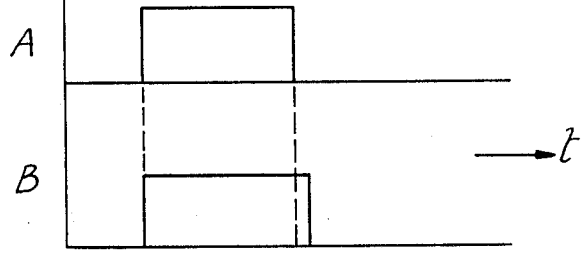

The signal produced by the photo-detector 18 and derived by means of the track 14 is utilised to prevent the rotor from being driven above its predetermined maximum speed as defined by the length of the section 15. FIG. 4 indicates in diagrammatic form the overspeed control circuit. In this figure is shown the light sources 17 and 22 directing light via the rotor 4 to the photo-detectors 18 and 23, which may be photo-multipliers. The signals produced by the photo-multipliers and indicated in FIGS. 3a and 3b are fed to amplifiers 24a and 24b. The output of amplifier 24b is connected back to a lamp supply circuit 17a to vary the light level in a sense tending to maintain the amplitude of the signal of FIG. 3a substantially constant. The output of the amplifier 24a feeds a pulse duration comparator 25 and a differentiating circuit 26, which latter circuit supplies a trigger pulse at the positive edge of the signal of FIG. 3b to trigger a pulse generator 27. When triggered, the pulse generator 27 supplies a reference pulse B of predetermined duration to the comparator 25. A signal at the output 28 of the comparator is effective to cause disconnection of the supply to motor 1 or otherwise to limit its speed. FIG. 5a illustrates the conditions at the comparator whilst the rotor is being run up to speed. At A is indicated the pulse fed to the comparator via the amplifier 24a and at B is represented the reference pulse B produced by the pulse generator. As indicated in this figure the pulse A has a longer duration than that of pulse B, indicating that the rotor speed is less than the permissible maximum speed. Under these conditions, there will be no signal at the output 28. When the rotor speed increases, the length of the pulse A falls until it reaches that of the pulse B. Any further increase of the rotor speed will further decrease the duration of the pulse A to give the condition illustrated in FIG. 5b, whereupon the comparator will issue an output signal at 28 which indicates that the rotor speed has increased above the maximum permissible speed. As indicated, this output signal will cause deceleration of the motor 1, for example by positive braking or merely by disconnecting its supply.

Figure 6:
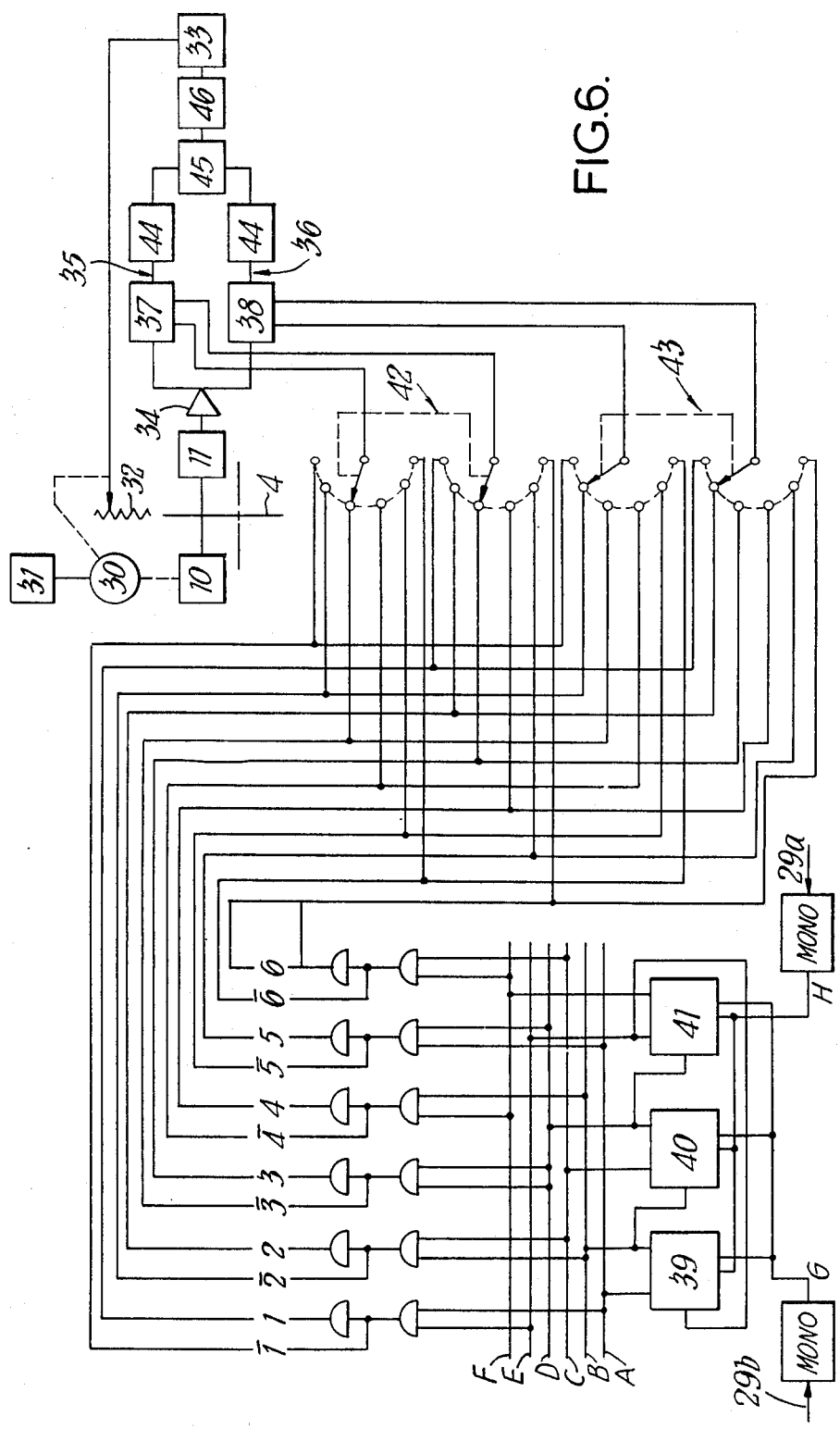
FIG. 6 is a block diagram of a circuit for synchronising the optical scanning in the centrifuge of FIG. 1.

The amplifiers 24a and 24b also produce signals on lines 29a and 29b for synchronising purposes in the circuit of FIG. 6 which controls the optical scanning of the cells in the centrifuge rotor.

FIG. 6 illustrates a stepping motor 30 driven by a pulse generator 31 and stepping a rheostat 32 which supplies the x input of and x-y recorder 33. The stepping motor 30 also controls the ultra-violet light generator 10 which supplies ultra-violet light through the cells of the rotor 4. The generator 10 produces a beam of elongate cross-section of ultra-violet light, the length direction of the cross-section extending at the cells in the peripheral direction in relation to the rotor axis. This beam is stepped radially along the rotor by means of the stepping motor. The light from the generator 10 passes to a photomultiplier 11 having passed through the rotor cells. Therefore, in each revolution of the rotor, having in the present example six cells, the photo-multiplier will produce six pulses relating to the respective cells and these pulses must be separated from one another. For this purpose, the pulses are fed, via an amplifier 34, to two signal channels 35 and 36. These channels contain respective gating and holding circuits including low-pass filters to form the average of the pulses received. Each circuit is operated so as to process and pass-on a signal relating to only one of the six pulses occurring in any one revolution of the rotor.

Figure 7:
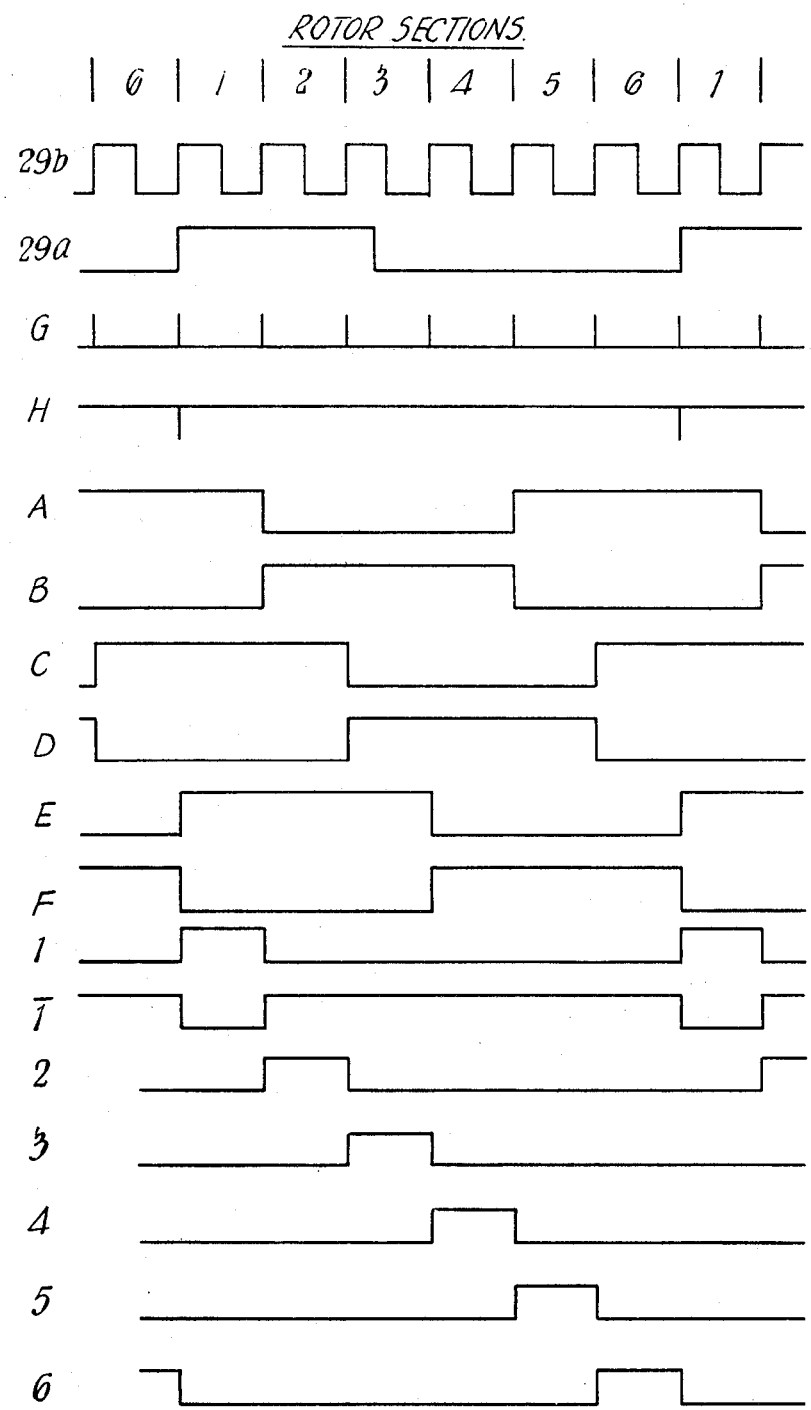
FIG. 7 is a diagram of the signals occurring in the circuit of FIG. 6.

The gating and holding circuits 37 and 38 are controlled by a counter having three bistable stages 39, 40 and 41 the outputs of which are connected to the circuits 37 and 38 via a decoder and respective six-position selector switch pairs 42 and 43. The setting inputs of the bistable stages are connected to the light sensor 23 via line 29b and a monostable circuit. The stages will therefore receive six pulses per revolution. The reset inputs of the bistable stages are each fed from the line 29a of FIG. 4 via a monostable circuit and are thus fed with one pulse per revolution. As a result, in each revolution of the rotor, the six fixed contacts of each selector switch of the pairs 42 and 43 will each receive one of six successive pulses from the counter 39, 40 and 41. The moment at which each of these pulses occurs is the moment at which the corresponding one of the rotor cells is passing the scanning position of the ultra-violet scanning system 10 and 11. The pulses occurring at points in the circuit of FIG. 6 are illustrated in FIG. 7.

It will now be assumed that a reference cell is in the second compartment of the rotor as counted from a reference position defined by the track 14 and as indicated in FIGS. 3a and 3b. Accordingly, the selector switch pair 43 will be positioned at its second position, as illustrated. As a consequence, the circuit 38 will be opened only during the time in which the reference cell is being scanned by the ultra-violet scanning system and accordingly the signal path 36 will only transmit a signal corresponding to that one of the six pulses from the photo-multiplier 11 which has originated from the reference cell. Let it also be assumed that for the present it is intended to monitor the sample cell in the third position of the rotor. The selector switch pair 42 will be in its third position, as illustrated, whereby the circuit 37, and thus the signal path 35, will be open to process only that one of the pulses from the photo-multiplier 11 which has originated from the sample cell in position 3.

The signals in signal channels 35 and 36 are combined so as to obtain a signal corresponding to the difference in optical density properties between the sample cell and the reference cell and this signal is fed to the y input of the recorder 33. To obtain this difference, each signal channel contains a circuit 44, which produces an output signal representing the logarithm of its input signal, and leads to a circuit 45 which forms a signal representing the difference between its input signals. A device 46 is connected between the circuit 45 and the recorder 33 to enable the scale of the recorder to be expanded and contracted as desired and to enable the y-origin to be chosen at will.

Finally, it is to be noted that the pulses of FIG. 3a have a repetition rate proportional to actual rotor speed and may thus be used to act upon the inverter 2 to maintain the rotor speed substantially at a presettable speed.

I claim:

1. In a centrifuge operable with a variety of rotors, with each rotor there being associated a maximum speed of rotation defined by an element carried by a respective one of said rotors, the centrifuge having means for sensing said element to prevent increase in the speed of rotation of said rotor when the maximum speed is reached, the improvement which resides in said element being a surface portion having, along an annular path centered on the axis of said rotor, a length defining the maximum speed and a property along its length which distinguishes said surface portion from the remainder of said annular path; said sensing means being arranged to sense said property of the surface portion without contact with said rotor to produce a signal having a time duration which is a function of said length; and means for sensing when the time duration of the signal has fallen to a predetermined value, wherein said rotor is an analytical rotor with at least two compartments to receive samples and carrying distinct portions corresponding to respective compartments in addition to said surface portion which also defines a predetermined angular position of said rotor, the centrifuge comprising a compartment examining system for sensing radiation passed through said compartments to produce corresponding signals; at least one signal path to which the signals will be fed; means for controlling which of the signals in each revolution of said rotor is conveyed through said signal path; said sensing means being also arranged to sense said distinct portions without contact with said rotor and operable in conjunction with said controlling means so that said signal path will carry a signal corresponding to just one of said compartments, and so that said one compartment will be defined.

2. The improvement in the centrifuge as defined in claim 1, comprising two signal paths, and wherein said controlling means are such that signals will be produced in each revolution on said signal paths, the signals corresponding to respective ones of two of said compartments.

3. The improvement in the centrifuge as defined in claim 2, further comprising difference forming means for producing a third signal corresponding to the difference between the data conveyed by the two signals on said two signal paths, the latter being coupled to said difference forming means.

4. The improvement in the centrifuge as defined in claim 1, wherein said controlling means includes selector means for selecting at will that one of said compartments to be examined.

5. The improvement in the centrifuge as defined in claim 4, comprising a logic circuit for deriving from the sensed predetermined angular position and a train of pulses, obtained by said sensing means from said distinct portions, separate trains of gating pulses corresponding to respective compartments for gating the signal path.

6. The improvement in the centrifuge as defined in claim 5, comprising two signal paths, and two of said selecting means for the respective signal paths, said logic circuit being connected to supply to each of said selecting means the separate trains of gating pulses, whereby each signal path can be independently gated by selection of particular ones of the separate trains.

7. The improvement in the centrifuge as defined in claim 1, wherein each of said distinct portions has a radiation-affecting property distinct from that of regions adjacent said distinct portion, and said sensing means are radiation sensitive.

8. The improvement in the centrifuge as defined in claim 7, wherein said sensing means are optical sensing means.

9. A centrifuge comprising an analytical rotor with at least two compartments to receive samples and carrying distinct portions corresponding to the respective ones of said compartments and a portion defining a predetermined angular position of said rotor; a compartment examining system for sensing radiation passed through said compartments to produce corresponding signals; a signal path to which the signals are fed; gating means in said signal path for controlling which of the signals in each revolution of said rotor is conveyed through said signal path; means for sensing said distinct portions without contact therewith to produce signals corresponding to said portions; logic means connected to receive the signals of said sensing means and to derive therefrom gating signals corresponding to said respective compartments; and means for selecting any one of the gating signals for transmission to said gating means, so that said signal path will carry a signal corresponding to the radiation passed through just one of said compartments and so that said one compartment will be defined by said selecting means.

10. A centrifuge as defined in claim 9, wherein said sensing means are optical sensing means.

11. A centrifuge as defined in claim 9, wherein said logic means includes a counter arrangement connected to be stepped by the signals corresponding to said distinct portions and to be reset by the signal corresponding to said portion defining a predetermined angular position of the rotor.

12. A rotor suitable for the centrifuge, the rotor having a plurality of compartments to contain samples, carrying a first annular track having a plurality of distinct sensible portions corresponding to respective ones of said compartments, and carrying a second annular track having a sensible portion subtending an angle at the axis of the rotor which defines a maximum desired speed of rotation of the rotor, said sensible portion subtending an angle having a property along its length along said second annular track which distinguishes said sensible portion from the remainder of said second annular track.

13. A rotor as defined in claim 12, wherein said distinct portions subtend equal angles at said axis.

* * * * *